United States Patent [19]

Schepers et al.

[11] 4,265,048

[45] May 5, 1981

[54] AUTOMATIC MOISTURE CONTROL FOR ROLLER APPLICATOR

[75] Inventors: James S. Schepers, Lincoln, Nebr.; Cary A. Gloor, Carrollton, Tex.

[73] Assignee: The United States of America as represented by the Secretary of Agriculture, Washington, D.C.

[21] Appl. No.: 99,813

[22] Filed: Dec. 3, 1979

[51] Int. Cl.³ .............................................. B05C 1/00
[52] U.S. Cl. ...................................................... 47/1.5
[58] Field of Search ......................................... 47/1.5

[56] References Cited

U.S. PATENT DOCUMENTS

| 4,208,835 | 6/1980 | Roll et al. | 47/1.5 |
| 4,223,478 | 9/1980 | McHugh | 47/1.5 |
| 4,223,479 | 9/1980 | Burnside | 47/1.5 |

*Primary Examiner*—Robert E. Bagwill
*Attorney, Agent, or Firm*—M. Howard Silverstein; David G. McConnell; Curtis P. Ribando

[57] ABSTRACT

A moisture control system for a contact roller-type fluid applicator automatically maintains the fluid level on the roller surface within a predetermined range. A sensor biased against the roller continuously monitors the moisture content and signals an electronic controller to initiate sequential wetting and delay cycles when it is below a preset value.

8 Claims, 5 Drawing Figures

AUTOMATIC MOISTURE CONTROL FOR ROLLER APPLICATOR

CROSS REFERENCE TO RELATED APPLICATION

This application is related to U.S. Application Ser. No. 056,334 filed by Orvin C. Burnside on July 10, 1979 and now U.S. Pat. No. 4,223,479, and drawn to some of the broad concepts disclosed herein for moisture control of a roller applicator.

BACKGROUND OF THE INVENTION

1. Field of the Invention

A recent innovation in herbicide application equipment for weed control amongst field crops is the roller applicator. This device selectively dispenses herbicide solution onto weeds protruding above crop plants by direct contact with an absorbent roller. The roller is normally wetted by means of a perforated manifold pipe which drips herbicide at preestablished intervals along its length. With this applicator, a nonselective, translocated herbicide can be used in controlling tall growing weed escapes at an application rate of only 20% of that required by a broadcast sprayer. However, existing roller applicators have suffered the problem of maintaining the proper herbicide concentration on the roller to effect weed control without excessive drippage onto the crops. This invention relates to an automatic moisture controller for use with these roller applicators.

2. Description of the Prior Art

The concept of automatic moisture control is not in itself new, and has been applied to a variety of situations. For example, in U.S. Pat. No. 4,137,931 Hasenbeck discloses an irrigation control system in which soil matric potential as a function of water content is determined by a sensor, which in turn signals a solenoid water valve in a sprinkler line. A similar device is taught in an earlier patent by Hasenbeck. In U.S. Pat. No. 3,553,481 an irrigation system is automatically controlled by response to changes in resistance variation of subsurface sensors caused by changes in heat transfer as a function of soil moisture variation. While these control systems may be suitable for the irrigation of soil, neither is sufficiently condition-responsive to maintain the moisture concentration within a predetermined narrow range as would be required by the roller applicator.

Fegan, U.S. Pat. No. 3,376,877, shows an automatic moisture control system for particulate feed material on a conveyor. While this apparatus is designed to be more condition-responsive than the irrigation controllers discussed above, it is not suitable for control of the moisture on a nonuniformly wetted, unitary mass, such as a herbicide applicator.

SUMMARY OF THE INVENTION

We have now invented an automatic moisture control system for maintaining the moisture content of a contact roller-type fluid applicator within a predetermined narrow range. The system comprises a sensor having at least two electrodes spaced along the length of the roller and adapted to conform to at least a portion of the roller surface circumference. A means is provided for biasing the electrodes against the roller surface while permitting them to yield to irregularities in the roller circumference. A flow of electric current across the electrode varies with the resistance in the roller surface as a function of its moisture content. A controller provided with a timing function for equilibrium is responsive to the electric current flow and thereby automatically controls a valve for delivering fluid to the absorbent contact roller over a preset interval of time.

DETAILED DESCRIPTION OF THE INVENTION

Figure 1:
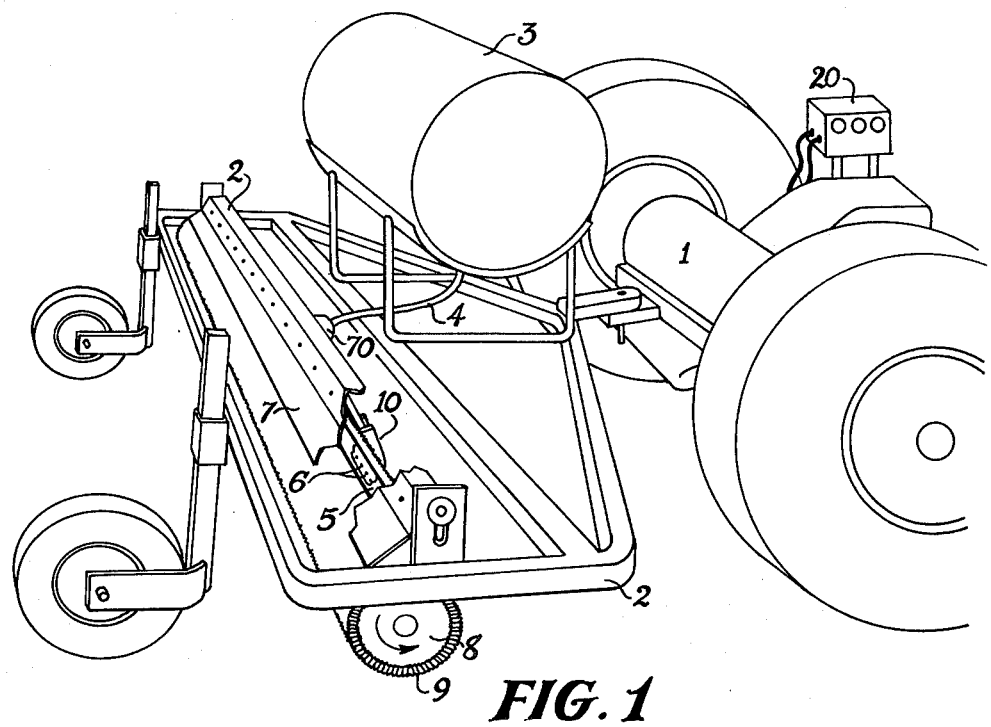
FIG. 1 is a perspective view of the sensor in combination with a contact roller-type fluid applicator.

FIG. 1 shows a typical contact roller-type fluid applicator for use in applying herbicides, foliar fertilizers, or other agricultural liquids to plants. While the applicator itself does not constitute a part of the invention, it will be described herein to the extent necessary for an understanding of the novel control system.

Figure 2:
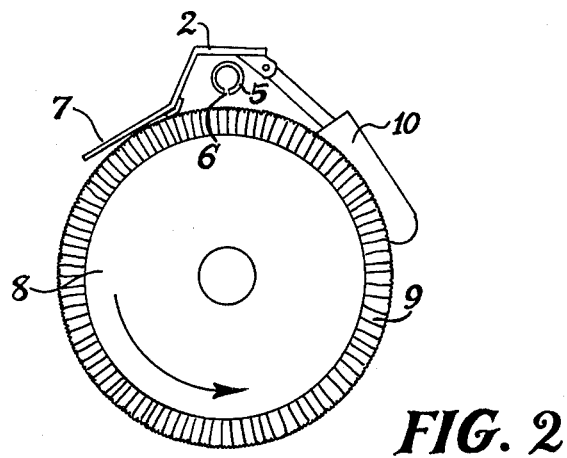
FIG. 2 is a side elevation view of the sensor and applicator shown in FIG. 1.

The roller 8 is mounted on a tractor 1 by means of frame 2 and is rotated by a motor (not shown) usually opposite the direction of travel; that is, in the direction opposite that of the tractor wheels as shown. The roller surface 9 is preferably a durable, absorbent material such as nylon pile carpeting. The herbicide or other liquid is supplied from storage tank 3 through a feed line 4 to a wetting device such as pipe 5 having perforations 6. A squeegee 7 may also be provided for assisting in dispersing the liquid to areas of the roller surface between perforations 6. For purposes of this invention, a sensor 10 is suitably mounted for contact with the roller surface 9 and an electrically operable valve such as solenoid valve 70 is inserted in feed line 4. The valve is preferably installed in close proximity to pipe 5 in oder to optimize the responsiveness of the system. The sensor may be positioned anywhere on the roller circumference, though certain placements are more advantageous than others, depending upon the particular applicator design and its proposed use. When placed on the front of the roller which is rotating opposite the direction of travel, the sensor is upstream from the wetting device annd thereby senses the moisture content of the roller surface after a certain amount of equilibration has occurred. When placed on the rear, the sensor is less susceptible to damage by coarse and abrasive plants. In either case, it is preferred that the sensor be located on the upper half of the roller as shown in FIG. 2 so that any liquid it compresses from the absorbent surface will be reabsorbed as it runs down.

Figure 3:
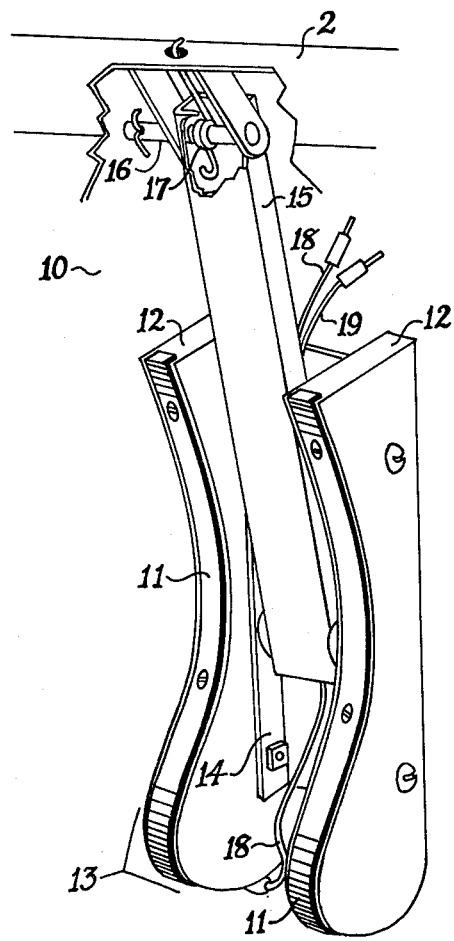
FIG. 3 is a detail perspective view of the sensor.
Figure 4:
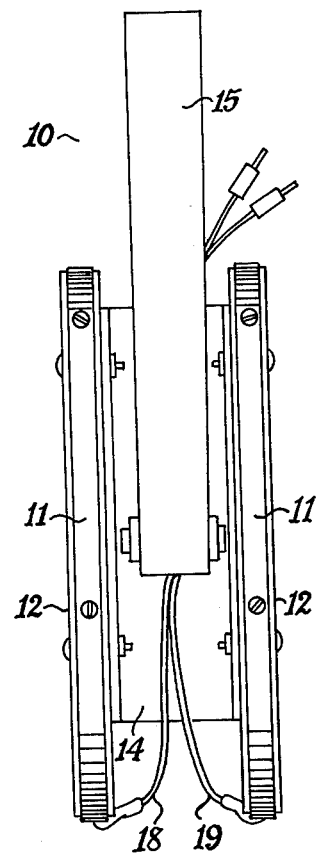
FIG. 4 is a front elevation view of the sensor.

Referring to FIGS. 3 and 4, sensor 10 comprises a pair of parallel metallic electrodes 11 mounted on nonconductive supports 12. The end of each support which receives the advancing carpet has a taper 13 to prevent snagging and to minimize dripping. The supports are secured to a spacer 14 having arm 15 extending therefrom for pivotally mounting the sensor to frame 2 by means of pin 16. Spring 17 tensioned between frame 2 and arm 15 biases the sensor electrodes against the roller surface while permitting it to yield to surface irregularities. For example, when carpeting is used as a roller surface, the seam produces an unavoidable depression in the roller circumference.

Since the electrical resistance between the electrodes is actually an average of the resistances between points along their lengths, the longer the electrodes, the more accurate the measurement. It is therefore preferred that the electrode length be between 10% and 20% of the roller surface circumference, though it is understood that dimensions outside of this range would be operable. The spacing between the electrodes is critical to the extent that for spacings less than the distances between pipe perforations 6, the electrical resistance for a nonequilibrated surface would be dependent upon the sensor position with respect to the perforations.

In an alternate embodiment, a plurality of sensors having paired electrodes in parallel, or a single sensor having a positive electrode on either side of the grounded electrode could be employed to obtain a more representative measurement of moisture content.

Figure 5:
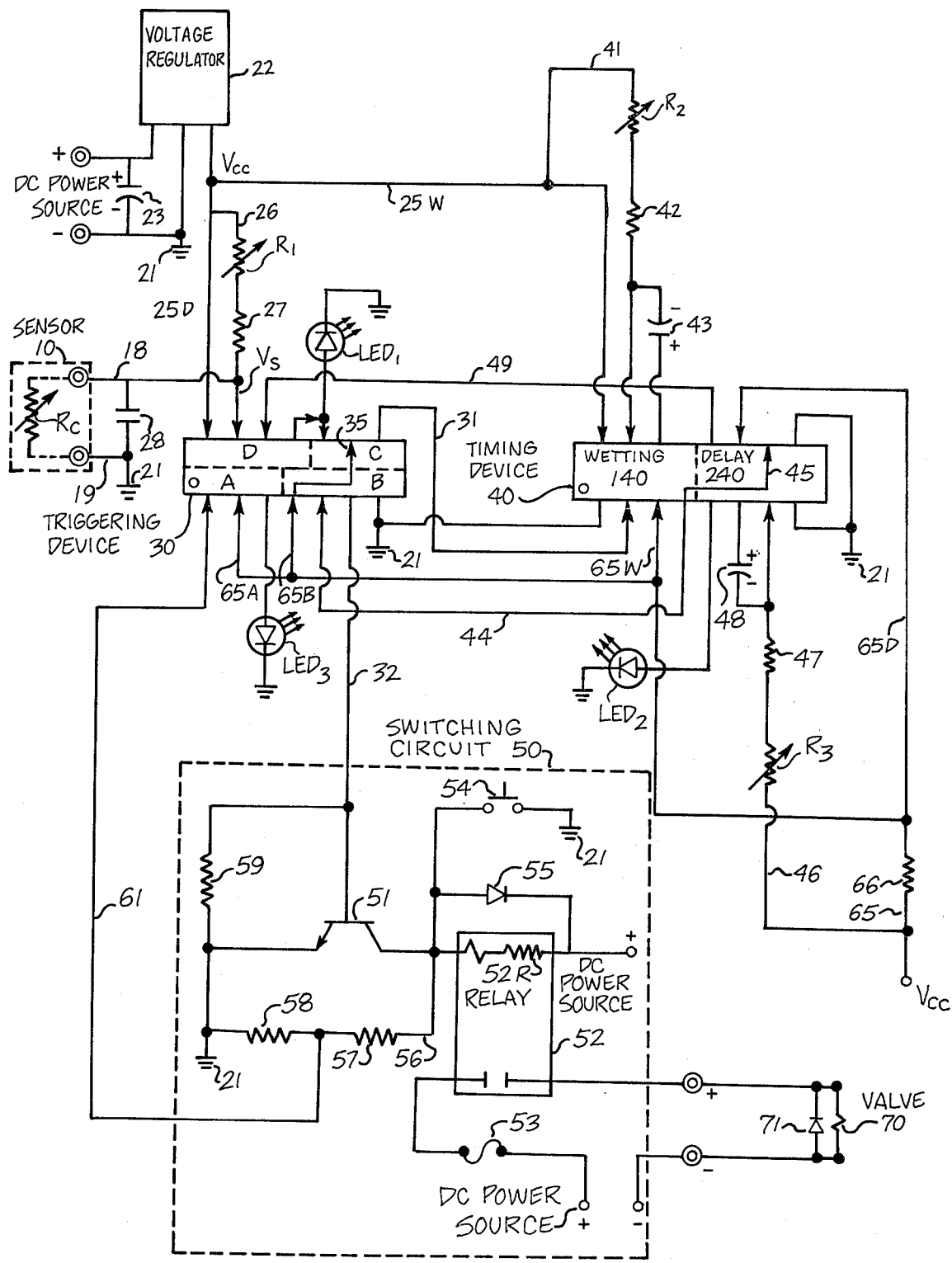
FIG. 5 is a circuit diagram illustrating the automatic moisture control system.

Positive conductor 18 and grounded conductor 19 lead from electrodes 11 and feed into control box 20 which is mounted in a convenient location on the tractor 1 (FIG. 1). Referring to FIG. 5, the operation of the automatic moisture control system contained in box 20 is illustrated in the circuit diagram. Voltage is supplied from DC power source having a ground 21 and is converted by voltage regulator 22 to the circuit voltage $V_{cc}$. Capacitor 23 functions as a noise filter. $V_{cc}$ passing through leads 25D and 25W drives the triggering device 30 and the timing device 40. Variable resistor $R_1$ in sensor circuit 26 is an adjustable control on box 20 for presetting the predetermined moisture content of roller surface 9. $V_{cc}$ in circuit 26 drops across $R_1$, baseline resistor 27, and finally across the carpet resistance $R_c$ between the electrodes 11 of sensor 10 to ground 21. Capacitor 28 serves as a noise filter.

The voltage drop $V_s$ between the sensor electrodes is read by triggering device 30. The triggering device is connected to the wetting function 140 of timing device 40 in a controlling relationship by means of circuit 31. The predetermined duration of the wetting cycle is preset by variable resistor $R_2$ on control box 20. In circuit 41 supplied by voltage $V_{cc}$, variable resistor $R_2$ and baseline resistor 42 operate in conjunction with capacitor 43 to regulate the wetting cycle. Function 140 initiates the wetting cycle through a feedback circuit 44 to triggering device 30 having an output lead 32 to switching circuit 50.

The switching circuit includes transistor 51 for controlling current flow through relay switch 52. When the relay switch is closed, current from the DC power source flows through fuse 53 and to the electrically operated valve 70. Diode 71 acts to prevent arcing across the points of relay switch 52. Switching circuit 50 is also provided with manual override switch 54 which is mounted on the face of control box 20. This permits closing of the relay switch and opening of the valve independently of the triggering and timing devices. Diode 55 serves the same function as diode 71.

Timing device 40 is also equipped with an equilibrium or delay function 240 which is automatically activated upon termination of the wetting cycle via crossover 45. The predetermined duration of the equilibrium cycle is set by variable resistor $R_3$ also on the face of control box 20. In circuit 46 supplied by voltage $V_{cc}$, $R_3$ and baseline resistor 47 cooperate with capacitor 48 to regulate the equilibrium cycle. The delay function 240 is tied into the triggering device in a controlling relationship by means of feedback circuit 49.

The control box 20 is further equipped with a series of indicator lights for monitoring the carpet wetness and the state of the wetting and equilibrium cycles. In FIG. 5, these lights are illustrated as light emitting diodes (LED's), though it is understood that other types of indicators could be used. $LED_1$ is connected to the triggering device in a manner which indicates carpet wetness. $LED_2$ is responsive to the delay cycle, and $LED_3$ is responsive to the wetting cycle.

OPERATION OF THE INVENTION

In the preferred embodiment of the invention, the triggering device 30 is a quad NAND Schmitt-trigger, and the timing device 40 is a dual monostable multivibrator. In FIG. 5, the four NAND gates of the Schmitt-trigger are labeled A-D, and the monostables of the multivibrator correspond to the wetting and delay functions. The operation of the control system will now be described in terms of these integrated circuits.

At the beginning of a typical field operation, the roller surface 9 is dry and all of the LED's are off. The surface is most expediently wetted with liquid from storage tank 3 by depressing manual override switch 54 on control box 20. This closes the relay switch 52 and opens the valve 70 to permit flow through feed line 4 and into perforated pipe 5. This also shorts the current flow through circuits 56 and 61 resulting in a low level input to gate A. It is noted that the other input to gate A is maintained at a constant high level voltage supplied by $V_{cc}$ via circuits 65, 65A, and baseline resistor 66. Since the NAND logic translates all but a double high level input into a high level output, the closing of switch 54 causes $LED_3$ to go on, thereby indicating that wetting is taking place. As the moisture content reaches the predetermined level controlled by the setting of $R_1$, the voltage drop $V_s$ across resistance $R_c$ between sensor electrodes 11 falls below the triggering threshold of gate D and is read as a low level input. Since feedback circuit 49 delivers a high level input into the triggering device when the delay function of timing device 40 is off, the gate D output is now high and $LED_1$ is turned on. This tells the operator to release the manual switch, thereby closing the valve 70 and returning gate A input from lead 61 to high level, shutting off $LED_3$.

As the roller becomes dry, $R_c$ increases, resulting in a corresponding rise in $V_s$. When the Schmitt-trigger threshold is exceeded, the two high level inputs to gate D effect a low level output. $LED_1$ is turned off indicating a dry condition. Gate C now has a low level input from gate D and a high level input from circuit 65B and crossover 35. The resulting high level output signal is transmitted by circuit 31 to wetting function 140 which reponds by sending a low level signal back to gate B of the Schmitt-trigger via feedback circuit 44. This couples with the high level input from circuit 65B to yield a high level output to switching device 50. Transistor 51 activates relay 52, thereby opening valve 70 and turning on $LED_3$. Meanwhile, at the same time that wetting function 140 emits the low level output to gate B, it initiates the external timing circuit 41. Wetting is continued until termination of the cycle as regulated by the predetermined setting of $R_2$. When the wetting cycle is complete, $LED_3$ goes off and an output signal through crossover 45 turns the delay function 240 on. A low level signal is thereby sent back to gate D via feedback circuit 49. This lights up $LED_1$ and inhibits an output from gate C regardless of the signal from sensor 10. The activation of the delay function also turns on $LED_2$ and commences the delay cycle by means of external timing circuit 46. The length of the delay cycle is regulated by the predetermined setting of $R_3$. When it terminates, $LED_2$ goes off, gate D receives a high level signal from delay function 240, and sensor 10 again resumes command of the wetting function.

If the wetting system of the applicator is designed to wet the roller surface with a relatively large quantity of liquid per rotation with respect to the total moisture content, then it is desirable to preset the wetting cycle for an integral number of roller rotations to insure uniform wetting around the roller circumference. This precaution would of course be unnecessary where the relative delivery rate was low. Since the purpose of the delay cycle is to allow for equilibration, it is apparent that the more evenly the wetting system distributes the liquid on the roller surface, the shorter the requisite delay cycle. In an ideal wetting system, the delay could be eliminated altogether. However, variable wetting and delay cycles in the range of about 2-60 seconds would generally be desired.

The following example is intended only to further illustrate the invention and is not intended to limit the scope of the invention which is defined by the claims.

EXAMPLE

A. A moisture sensor was constructed for use with a commercial roller-type herbicide applicator comprising a 0.3-m. diameter by 4.6-m. long roller covered with a nylon pile carpet. The roller was designed to rotate opposite the direction of travel at 32 r.p.m. The sensor was similar to that illustrated in FIGS. 3 and 4 and comprised a pair of copper electrodes 1-cm. wide having an effective carpet contact length of 15 cm. and an interelectrode spacing of 4.6 cm. Tests indicated that resistances in the range of 1000-5000 ohms coincided with the desired carpet wetness.

B. Based upon the resistance values obtained above, a control system was constructed in accordance with the circuit diagram shown in FIG. 5. The specific components, values, and outputs are shown in the Table below.

It is understood that the foregoing detailed description is given merely by way of illustration and that modification and variations may be made therein without departing from the spirit and scope of the invention.

TABLE

| Component | Function | Leg-Legend | Value |
|---|---|---|---|
| Storage battery | DC power | | 12V |
| Integrated circuit 7805 | Voltage regulator | 22 | 5V output ($V_{cc}$) |
| Schmitt-trigger 74132 | Triggering device | 30 | 5V (1.7V threshold) |
| multivibrator 74221 | | | |
| Darlington transistor | Current control to relay | 51 | 8A |
| Relay PRD5DYO | Relay switch | 52 | 12V |
| Switch | Manual override | 54 | 1A |
| Fuse | Circuit protector | 53 | 15A |
| LED's | Circuit indicators | | |
| Resistors: | | | |
| Variable: | Roller wetness control | $R_1$ | 10K |
| | Wetting cycle | $R_2$ | 38K |
| | Delay cycle | $R_3$ | 38K |
| control | | | |
| Constant: | Impedance | 27 | 1K |
| | Impedance | 42 | 1.8K |
| | Impedance | 47 | 1.8K |
| | Impedance | 52R | 71 ohms |
| | Impedance | 57 | 2.2K |
| | Impedance | 58 | 1K |
| | Impedance | 59 | 1K |
| | Impedance | 66 | 1K |
| Capacitors: | Noise filter | 23 | 1000 $\mu F$ |
| | Noise filter | 28 | 0.1 $\mu F$ |
| | External timing | 43 | 1000 $\mu F$ |
| | External timing | 48 | 1000 $\mu F$ |
| Diodes: | Arc suppressor | 55 | 1A |
| | Arc suppressor | 71 | 6A |

Theoretical wetting cycle range (approximate) 1-28 seconds
Actual wetting cycle range (approximate) 1-60 seconds
Theoretical delay cycle range (approximate) 1-28 seconds
Actual delay cycle range (approximate) 1-60 seconds

We claim:
1. In a moisture control system for use with a contact roller-type, fluid applicator for treating plants, wherein said applicator comprises a roller having a fluid absorbent surface for contacting said plants and a wetting device for delivering said fluid to said roller surface, the apparatus comprising:
   a. a sensor comprising at least two electrodes spaced apart along the length of said roller and adapted to conform to at least a portion of said roller surface circumference;
   b. means for yieldingly biasing the electrodes of said sensor against said roller surface;
   c. an electric current source coupled to said sensor whereby the flow of electric current across said electrodes varies with the resistance in said roller surface as a function of its moisture content; and
   d. controlling means provided with a timing function for wetting said surface and a timing function for moisture equilibrium on said surface, wherein said controlling means is responsive to said electric current flow across said electrodes for automatically controlling a valve upstream of said wetting device.

2. The apparatus as described in claim 1 wherein the position of said sensor on said roller surface circumference is upstream of said wetting device and in close proximity to said wetting device relative to the total roller circumference.

3. The apparatus as described in claim 1 wherein said sensor comprises one positive and one grounded electrode, wherein said electrodes are of equal length and each contact an arc on said roller surface equal to at least one-tenth of its circumference.

4. The apparatus as described in claim 1 wherein said controlling means comprises:
   a triggering device responsive to said electric current flow across said electrodes for generating a first output signal, and also responsive to said timing function for wetting for generating a second output signal;
   a timing device comprising said timing function for wetting and said timing function for equilibrium, wherein said timing device is responsive to said first output signal for sequentially initiating a wetting timing cycle and an equilibrium timing cycle, respectively; and circuitry for conducting said second output signal to said automatically controlled valve whereby said valve is controlled.

5. The apparatus as described in claim 4 wherein said controlling means further comprises a feedback circuit from the equilibrium timing function of said timing device to said triggering device whereby an output signal from said equilibrium timing function passing through said feedback circuit inhibits said first and second output signals at least until the termination of said equilibrium timing cycle.

6. The apparatus as described in claim 4 wherein said triggering device and said timing device are integrated circuits and said circuitry for conducting said second output signal includes a relay switch.

7. The apparatus as described in claim 1 and further comprising means for varying the duration of each of said timing functions within predetermined ranges.

8. The apparatus as described in claim 1 and further comprising a means for varying the flow of the electric current source within a predetermined range.

* * * * *